(12) United States Patent
Lok

(10) Patent No.: US 7,847,425 B2
(45) Date of Patent: Dec. 7, 2010

(54) TIDAL FLOW POWER GENERATOR

(75) Inventor: Pak Yan Lok, Kowloon (HK)

(73) Assignee: Pakto Company Limited, Kowloon (HK)

( * ) Notice: Subject to any disclaimer, the term of this patent is extended or adjusted under 35 U.S.C. 154(b) by 396 days.

(21) Appl. No.: 12/095,911

(22) PCT Filed: Mar. 8, 2006

(86) PCT No.: PCT/CN2006/000346

§ 371 (c)(1),
(2), (4) Date: Jun. 2, 2008

(87) PCT Pub. No.: WO2007/068157

PCT Pub. Date: Jun. 21, 2007

(65) Prior Publication Data

US 2008/0272599 A1    Nov. 6, 2008

(30) Foreign Application Priority Data

Dec. 16, 2005    (HK) .................. 05111621

(51) Int. Cl.
 *F03B 13/12*    (2006.01)
(52) U.S. Cl. .......................... 290/42; 60/398
(58) Field of Classification Search .......... 290/42, 290/43, 54, 53; 60/398, 325; 416/7, 85, 416/8; 415/5; 104/24
See application file for complete search history.

(56) References Cited

U.S. PATENT DOCUMENTS

| 3,857,242 | A  | * | 12/1974 | Gilmore | 60/495 |
| 4,163,905 | A  | * | 8/1979 | Davison | 290/54 |
| 4,589,344 | A  | * | 5/1986 | Davison | 104/24 |
| 6,249,057 | B1 | * | 6/2001 | Lehet | 290/1 R |
| 7,075,191 | B2 | * | 7/2006 | Davison | 290/54 |
| 7,650,749 | B2 | * | 1/2010 | Borgesen | 60/495 |
| 2004/0093863 | A1 | * | 5/2004 | Huang | 60/495 |

FOREIGN PATENT DOCUMENTS

| CN | 2030262 | 1/1989 |
| CN | 1584325 | 2/2005 |
| GB | 1504104 | 3/1978 |

* cited by examiner

*Primary Examiner*—Michael C Zarroli
(74) *Attorney, Agent, or Firm*—J.C. Patents

(57) ABSTRACT

The present invention relates to a tidal flow power generator comprising a waterpower conversion unit, a transmission mechanism and a generator set. The waterpower conversion unit converts the thrust of the water into rotational kinetic energy through foldable sails, and the kinetic energy is transmitted to the generator set by the transmission mechanism. The present tidal flow power generator is of simple structure and could effectively make use of various waterpower resources.

14 Claims, 6 Drawing Sheets

TIDAL FLOW POWER GENERATOR

FIELD OF THE INVENTION

The present invention relates to the field of a generator, particularly to a tidal flow power generator for converting the kinetic energy of water flow into electrical energy.

BACKGROUND OF THE INVENTION

Water covers about 70.9% of the total surface area of the earth, and the flow of water involves huge kinetic energy. People know how to make use of waterpower resources long ago. Presently, the waterpower is widely used by modern societies to generate electricity for industrial production. However, the conventional waterpower generators are of complex structure and huge volume, and the hydrological and geological requirements thereof are very strict. Therefore, the construction cost for such conventional waterpower generator is very high.

To enable make the best use of different kinds of waterpower resources, researchers in this field have designed various mechanisms to try to convert the kinetic energy of water into electrical energy in low cost. However, none of such existing designs could provide an effective solution in this matter.

SUMMARY OF THE INVENTION

To solve the problems in the prior arts, the object of the present invention is to provide a tidal flow power generator, which could effectively convert the kinetic energy of water to electrical energy and could be adjustable according to the water flow and other geological conditions.

To achieve the above object, the tidal flow power generator of the present invention comprises a waterpower conversion unit, a transmission mechanism and a generator set, in which the waterpower conversion unit includes: a cuboid shaped flow confining housing arranged longitudinally along the direction of water flow which has flow confining plates forming the sides of the flow confining housing and reinforcing supports provided between the flow confining plates, in which the both ends of the flow confining housing in longitudinal direction are open to allow water flow to pass through; a main frame mounted in the flow confining housing which has two chain sprockets spaced apart from each other, an endless track chain engaged with the two chain sprockets, and a plurality of foldable sails hinged to the track chain at one end and stretchable in a single direction, in which a inclined cable is connected between each foldable sail and the track chain, and the length of the inclined cable is determined to ensure that the foldable sails are substantially perpendicular to the track chain when the foldable sails reach the maximum stretchable extent, the part of the track chain on which the foldable sails attached are unfolded and pushed by the water is a working section while the other part of the track chain is a non-working section, and the distance between the working section and the respective flow confining plate is equal to or a little larger than the length of the foldable sails when they fully stretch out, while the distance between the non-working section and the respective flow confining plate is a minimum distance allowing the folded foldable sails to pass through with the track chain, the foldable sails are unfolded by the thrust of the water and then drive the track chain to rotate which force the rotation of the chain sprockets, and output gears attached on rotating shafts of the chain sprockets are engaged with the transmission mechanism and the latter finally drive the generator set to generate electricity.

In an embodiment of the present invention, the flow confining plate is provided with a pivotable flow concentration plate near the non-working section at the upstream side of the water flow, and the flow concentration plate is hinged to the flow confining plate and opens towards the downstream side when the water flow passes by in which the maximum degree it could be opened is more than 90°, and the size of the flow concentration plate is determined in the manner that the height of the tip of the flow concentration plate is between the working section and the non-working section when it opens to the maximum degree The waterpower conversion unit may further comprise a balance device provided on the flow confining housing, which has a water supplying and discharging means to control the position of the waterpower conversion unit in the water.

In another embodiment of the present invention, each foldable sail comprises a plurality of segments, and the adjacent segments are hinged to each other, and a plurality of inclined cables are connected between the foldable sails and the track chain, in which the cables are parallel to each other when they fully stretch out. When the working section of the track chain is disposed above the non-working section, one or more vacuum chambers are formed within one or more segments at the top end of each foldable sail, to facilitate the buoyancy and then stretching of the foldable sails.

The tidal flow power generator of the present invention is of simple structure and does not have special requirements for assembly, which could effectively make use of various waterpower resources. Under the current condition of tight energy supplies, the embodiment of the present invention could provide a feasible solution for this problem disturbing the development of social economy.

BRIEF DESCRIPTION OF THE DRAWINGS

The present invention will be described in detail with reference to the accompanying drawings, in which.

DETAILED DESCRIPTION OF THE INVENTION

Figure 1:
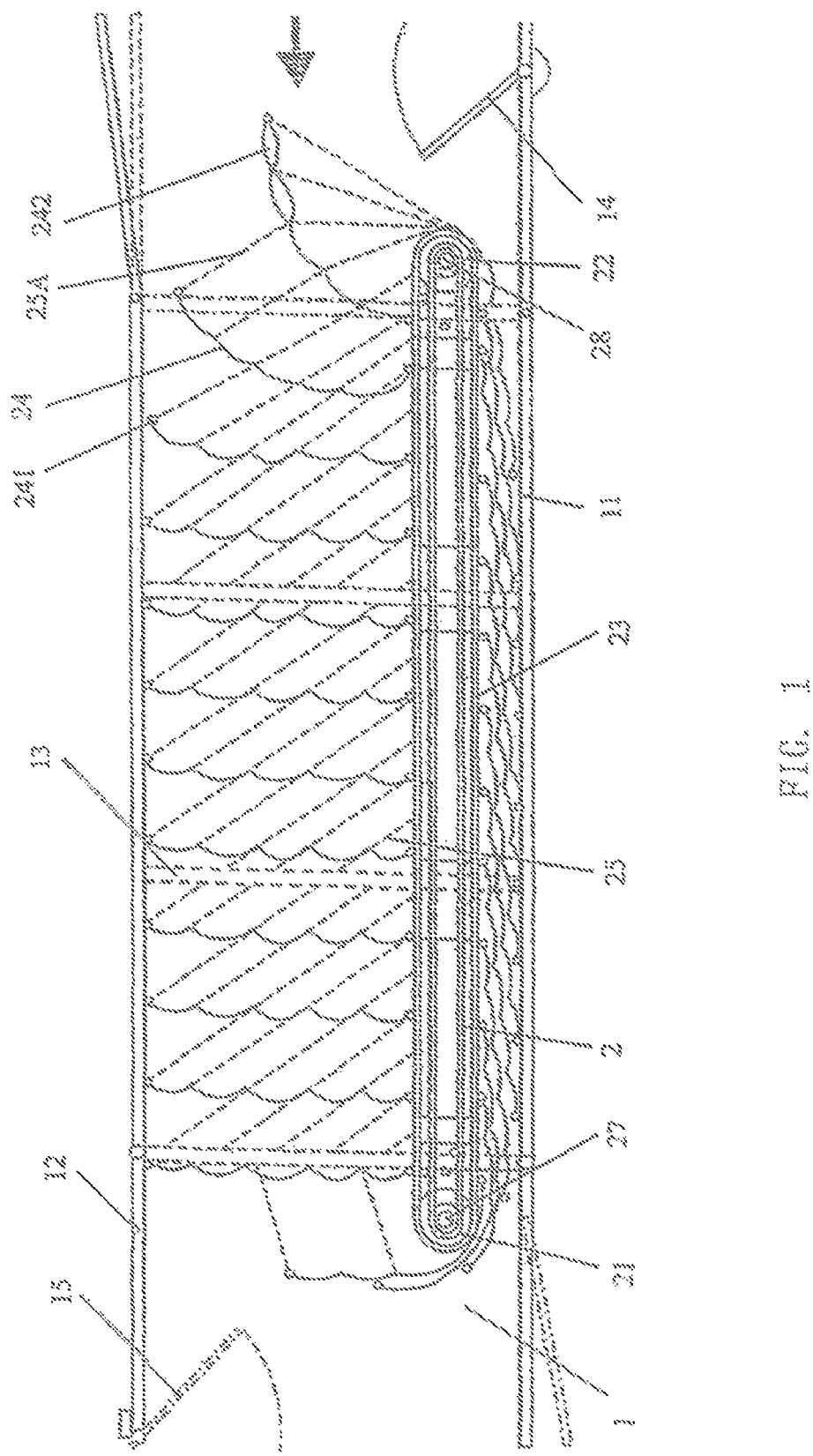
FIG. 1 is a schematic view illustrating a waterpower conversion unit in an embodiment of the tidal flow power generator according to the present invention.
Figure 2:
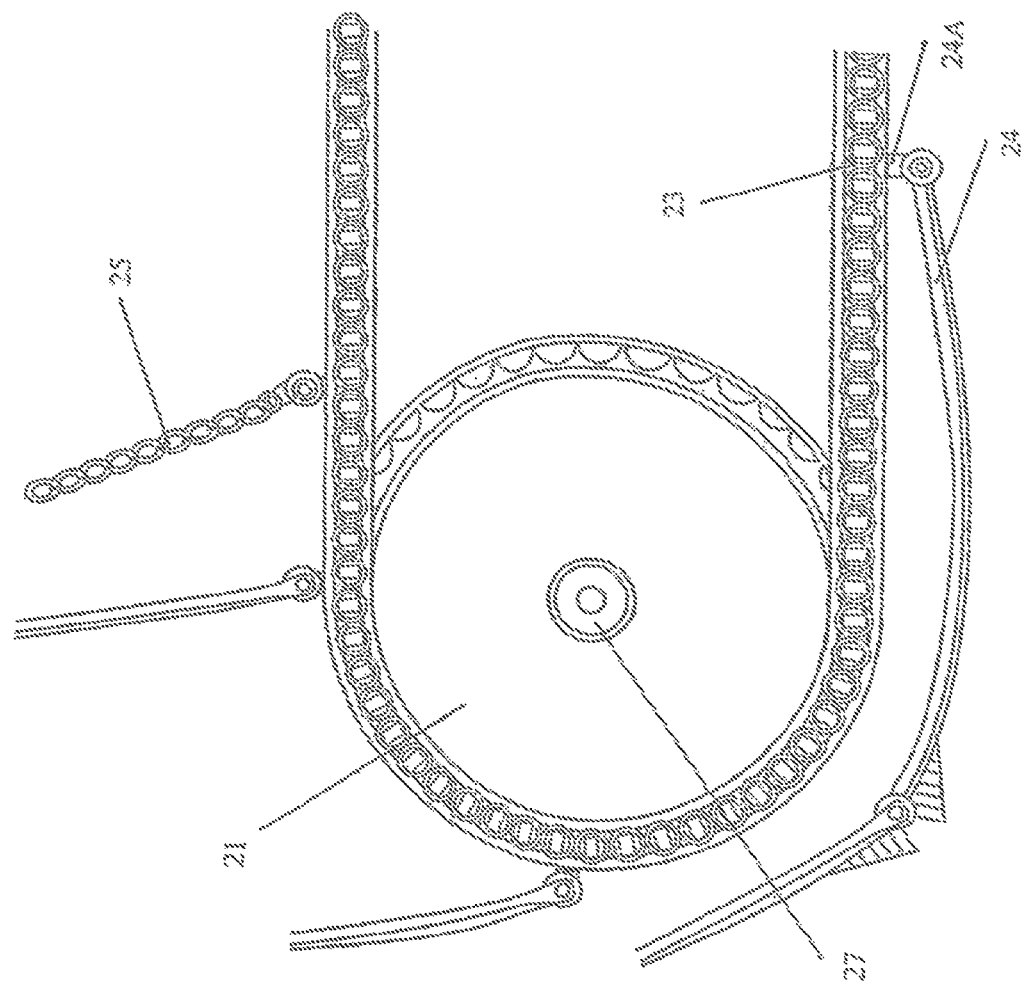
FIG. 2 is a partial enlarged schematic view illustrating a chain sprocket in the embodiment shown in FIG. 1.

The tidal flow power generator of the present invention mainly comprises three parts, i.e. a waterpower conversion unit, a transmission mechanism and a generator set, in which the transmission mechanism and the generator set may be any known technical solutions in this field, and the present invention mainly focuses on the waterpower conversion unit. As shown in FIG. 1, the waterpower conversion unit comprises a cuboid shaped flow confining housing 1. The flow confining housing includes an upper and lower flow confining plate 11 and 12, and a plurality of reinforcing supports 13 are provided between the flow confining plates. The flow confining housing 1 is arranged longitudinally along the direction of water flow, and the sides of the flow confining housing may be open or close while the both ends thereof in the longitudinal direction are open to enable the water flow to pass through. A main frame 2 is mounted in the flow confining housing 1, which includes two chain sprockets 21 and 22 spaced apart from each other in the longitudinal direction. An endless track chain 23 is engaged with the two chain sprockets 21 and 22. A plurality of foldable sails 24 are attached to the track chain 23, in which the foldable sails 24 are hinged to the track chain 23 to enable to be unfolded along the direction of water flow. FIG. 2 illustrates the chain sprockets 21 and track chain 23 in detail. Hinge shafts at the bottom of the foldable sails 24 may be connected with respective chain axes of the track chain 23 by virtue of coupling pieces 24B.

Each of the foldable sails may include a plurality of segments, and the adjacent segments are hinged to each other. One or more inclined cables 25 are connected between each of foldable sails and train chain, and each foldable sail may only stretch in one direction. To enable the stretching movement of a former foldable sail to actuate the stretching operation of a latter one, at least one connection cable 25A is connected between two adjacent foldable sails to ensure the smooth operation of the whole unit. In another preferred embodiment, the respective inclined cables of each foldable sail are connected to the track chain 23 through one or more former foldable sails.

In FIG. 1, the arrow indicates the direction of the water flow. When the water flow passes by, it will push and unfold certain foldable sails 24 on the upper side of the track chain, as the stretchable direction of the certain foldable sails there is identical to the direction of water flow. Since the surface area of the unfolded foldable sail is increased, the thrust applied on the foldable sails by the water will become even larger. When the foldable sails stretch to be substantially perpendicular to the surface of the track chain, the foldable sails reach the maximum stretchable extent and are subject to the largest thrust of the water. Each inclined cable 25 also fully stretches out to draw the foldable sails, to avoid the overstretching of the latter. A resultant force resulting from the thrust applied on the unfolded foldable sails by the water will drive the track drain to rotate, and then the thus generated power is supplied to the generator set via gears in the transmission mechanism to generate electricity. The part of the track chain 24 on which the foldable sails attached are unfolded and pushed by water is called as a working section, while the part of the track chain on which the foldable sails attached are folded is called as a non-working section. To facilitate the description of the present invention, the waterpower conversion unit may be divided into a working part and a non-working part accordingly, in which the working part includes the working section of the track chain and the unfolded foldable sails attached thereon, while the non-working part includes the non-working section of the track chain and the folded foldable sails attached thereon. When a foldable sail 24 approaches the chain sprocket 21, the track chain changes from the working section to non-working section. As the stretchable direction of the foldable sail is opposite to the direction of the water flow, the foldable sail could not be opened due to the resistance of the water flow. The distance between the lower side of the track chain, i.e. the non-working section, and the lower flow confining plate 12 should be as small as possible so far as the folded foldable sails 24 are allowed to pass therebetween together with the track chain. The distance between the upper side of the track chain, i.e. the working section, and the upper flow confining plate 11 should be equal to or a little larger than the length of the foldable sails 24 when they fully stretch out, to make full use of the energy of the water flow. To decrease the resistance generated from the contact between the top end of the foldable sails and the flow confining plates, a rolling element 241 could be provided at the tip of each foldable sail, such as roller or rolling bearing, to contact with the flow confining plates. Thus, the friction between the foldable sails and the flow confining plates changes from sliding friction to rolling friction. Therefore, the resistance between the foldable sails and the flow confining plates and their abrasion could be lowered. The rolling elements may be detachable, thus, they could be exchanged after being worn.

In order to form a swirling flow of water near the transition from the non-working section to the working section to facilitate the opening of the foldable sails 24 during the course of the movement of the foldable sails 24 from the non-working section to the working section, a flow concentration plate 14 may be provided as shown in the figures. According to the direction of water flow, the flow concentration plate 14 is hinged to the flow confining plate 11 near the non-working section of the track chain at the upstream side. The flow concentration plate 14 is pivotable with the opening direction thereof identical to the direction of water flow. When the flow concentration plate 14 is opened by the thrust of the water, the maximum degree it could be opened is more than 90°. To decrease the adverse effect of water flow to the non-working section, the height of the flow concentration plate 14 should be between the heights of working section and non-working section of the track chain when the flow concentration plate is opened to the maximum degree. The distance between the flow concentration plate 14 and the track chain 23 and the chain sprocket 22 should not affect the opening of the foldable sails during the movement of the foldable sails from the non-working section to the working section.

To enable the smooth opening of the foldable sails, one or more segments of each foldable sail could be provided with vacuum chambers therein, as indicated by a reference numeral 242 in the figures. When foldable sails 24 move from the non-working section to the working section, the vacuum chambers offer larger buoyancy to the foldable sails to assist the smooth opening of the latter.

Preferably, the foldable sails of the present invention are made of rigid materials, such as metal sheets or rigid plastic sheets. Comparing to the flexible materials, the rigid materials are subject to larger thrust applied by the water flow.

When the direction of water flow is opposite to the direction indicated in FIG. 1, the working section of the track chain on the main frame 2 should be the lower side, while the non-working section should be the upper side, thus, the position of the chain sprockets are adjusted to make the distance between the lower side of the track chain (i.e. the working section) and the flow confining plate 11 is equal to or a little larger than the length of the foldable sails 24 when they fully stretch out, and to make the distance between the upper side of the track chain (i.e. the non-working section) and the flow confining plate 12 is as small as possible. Therefore, the foldable sails attached on the lower side of track chain could be unfolded by the thrust of the waterpower, and in turn drive the track chain to rotate. Then, the rotating shafts 27 and 28 will rotate in counter-clock direction, and thus could drive the generator set to generate electricity. Similar to the flow concentration plate 14, a flow concentration plate 15 may be provided at the flow confining plate 12 at the upstream side, as shown in the figure.

Figure 4:
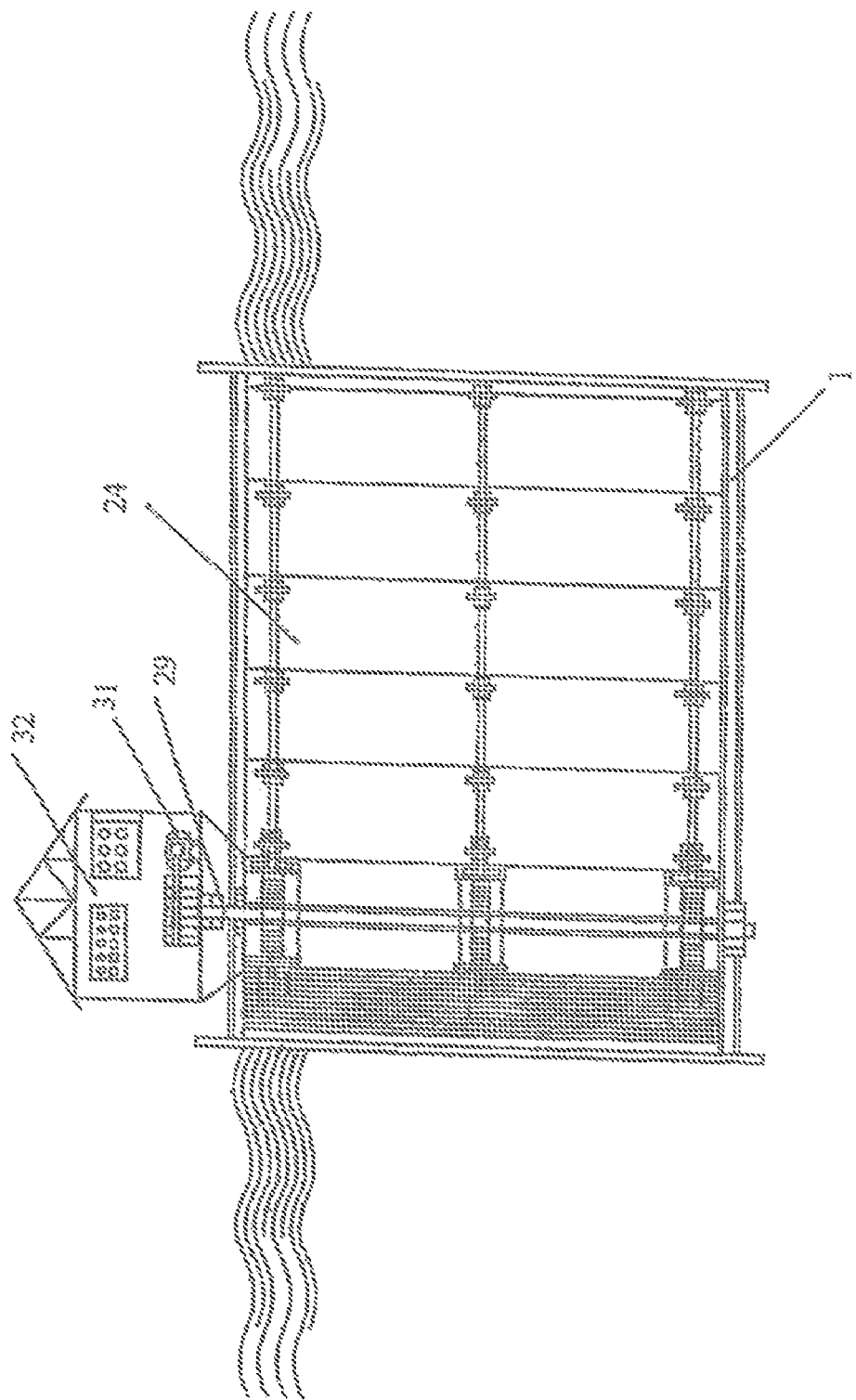
FIG. 4 is a schematic view of still another embodiment of the present tidal flow power generator of which the waterpower conversion unit is constructed on the surface of the water, in which the working section and non-working section thereof are aligned in horizontal direction.

The working section and non-working section of the waterpower conversion unit shown in FIG. 1 are aligned in vertical direction, however, they could also be aligned in horizontal direction, that is, the unfolded foldable sails could be in vertical direction or in horizontal direction. In the latter situation, the flow confining housing comprises left and right flow confining plates (or called as front and back flow confining plates). Such kind of tidal flow power generator is shown in FIG. 4.

A main frame adjustment mechanism may be provided in the flow confining housing of the present water conversion unit, which is used to adjust the position of the main frame according to the direction of water flow. Thus, the positions of the working section and non-working section of the track chain could be changed accordingly. Therefore, a signal main frame could make use of water flows in different directions to generate electricity.

However, the main frame of the present invention may be immobile rather than adjustable. To make use of water flows in different directions, the tidal flow power generator of the present invention may comprise a plurality of waterpower conversion units with respective main frames in different orientations. They are aligned in horizontal or vertical direction, and start to work respectively upon facing to a suitable water flow. Thus, in spite of a rising tide or an ebb tide, the tidal flow power generator of the present invention could operate continuously.

Figure 3:
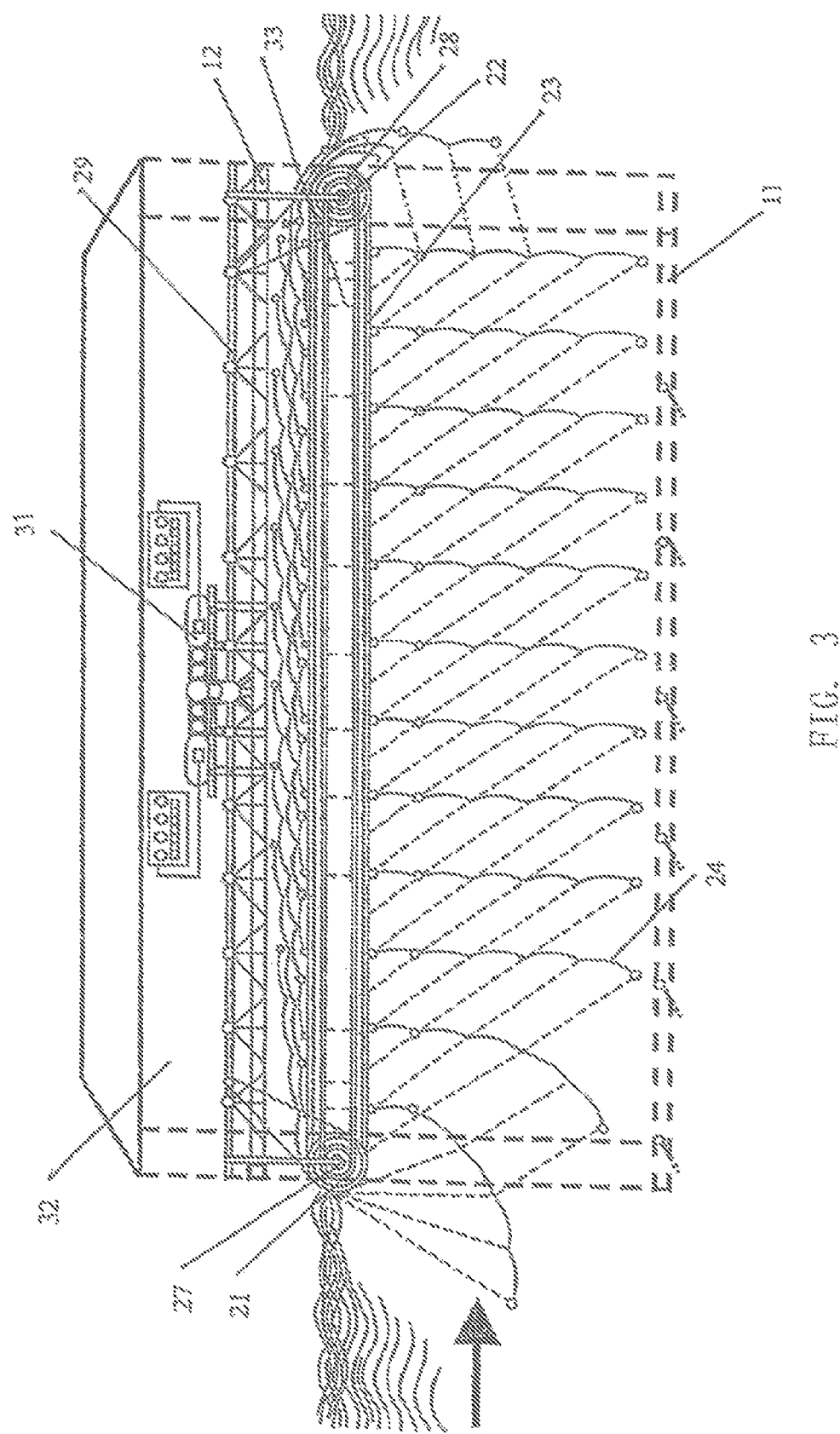
FIG. 3 is a schematic view of another embodiment of the present tidal flow power generator of which the waterpower conversion unit is constructed on the surface of the water, in which the working section and the non-working section thereof are aligned in vertical direction.

In addition, the waterpower conversion unit of the present invention may be mounted on the ground beneath the water, in the water or on the surface of water, and they could be mounted in the river or in the sea. In the embodiment shown in FIG. 3, the waterpower conversion unit is mounted on the surface of water. The non-working and working section thereof are aligned in vertical direction, that is, the unfolded foldable sails are in vertical direction. The power generated from the waterpower conversion unit is transmitted to the generator set 31 mounted in a generator room 32 via the transmission mechanism 29. The generator set 31 finally converts the kinetic energy to electrical energy, and the electrical energy is supplied to respective users via cables.

FIG. 4 shows another embodiment of the present invention of which the waterpower conversion unit is also mounted on the surface of water, but the non-working section and working section of thereof are aligned in horizontal direction, that is, the unfolded foldable sails are in horizontal direction.

Figure 5:
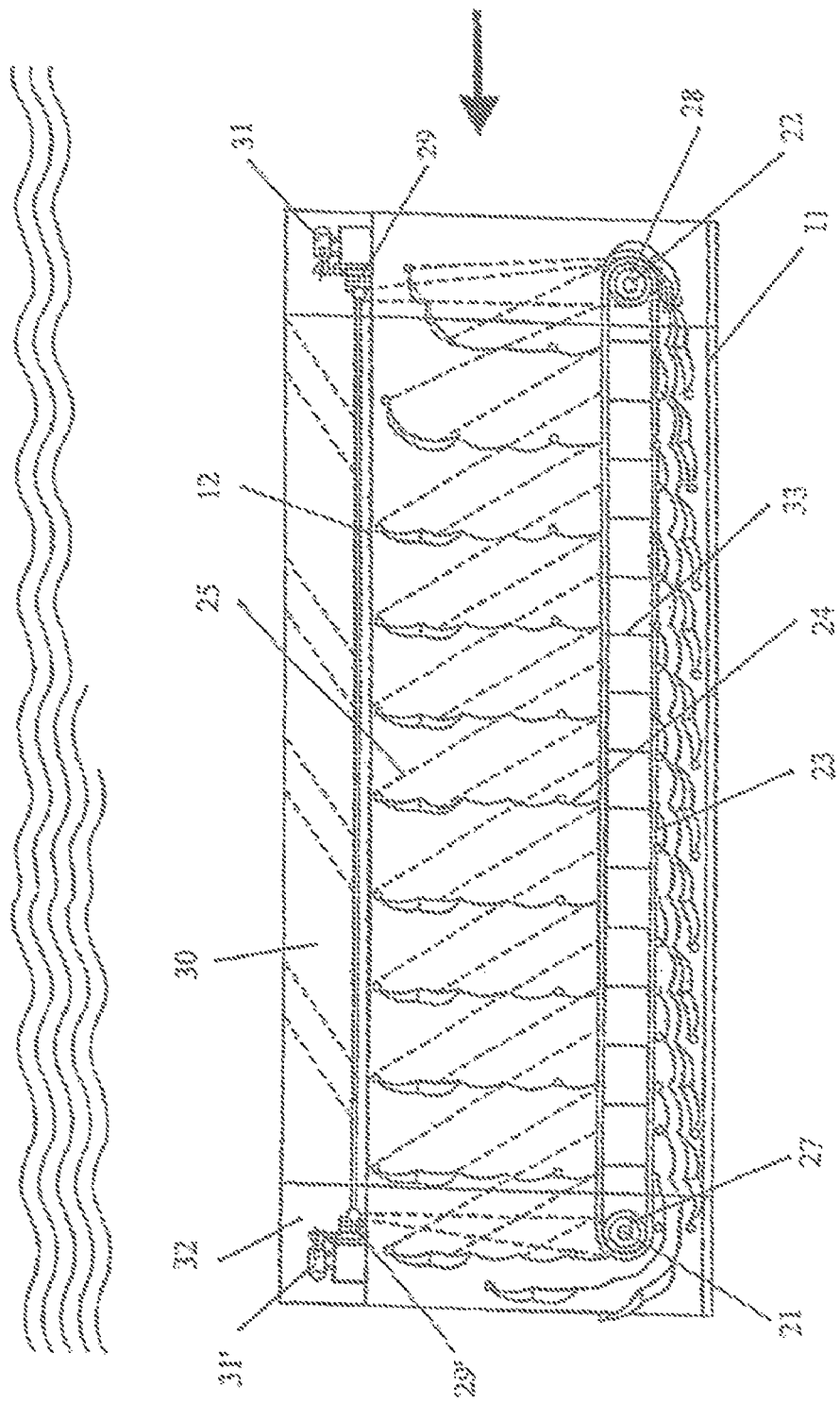
FIG. 5 is a schematic view of still another embodiment of the present tidal flow power generator constructed on the ground beneath the water.
Figure 6:
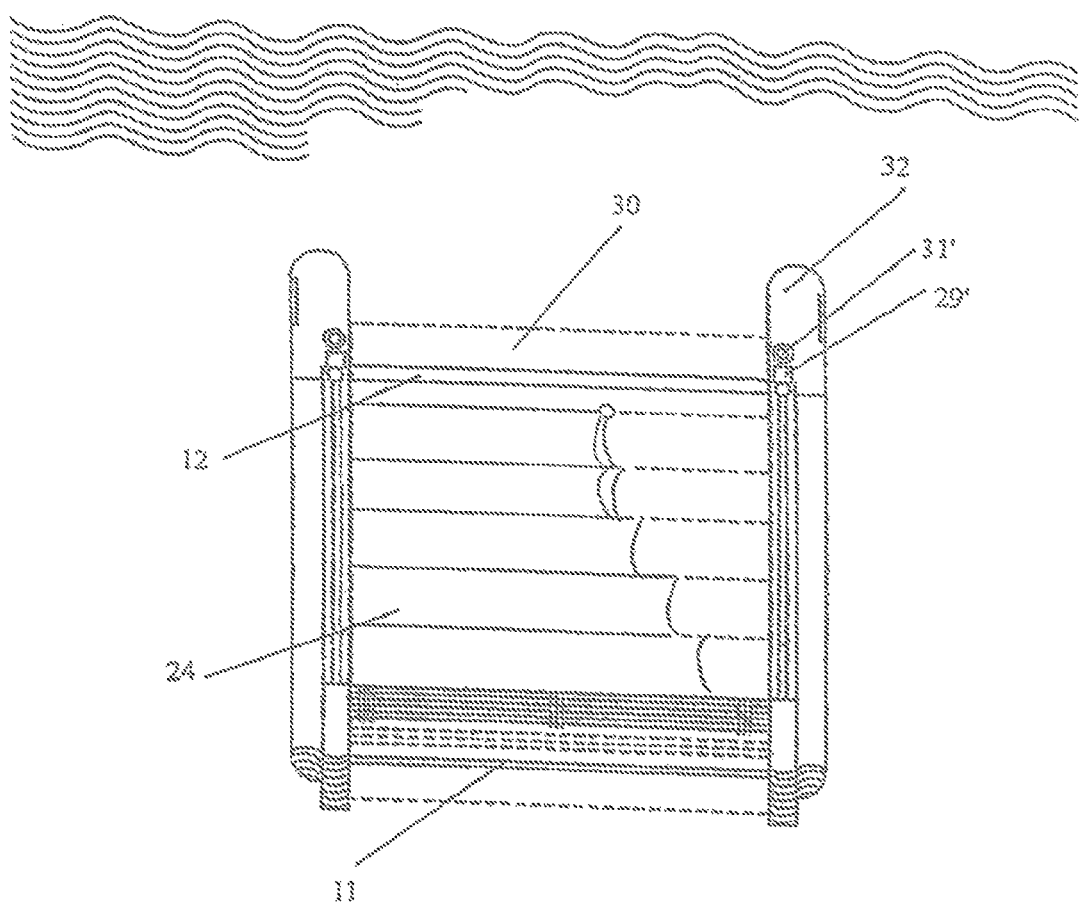
FIG. 6 is a side view of the embodiment shown in FIG. 5.

FIG. 5 shows an embodiment of the present invention of which the waterpower conversion unit is mounted on the ground beneath the water. In the embodiment, the transmission mechanisms 29, 29' and generator set 31, 31' are provided around the flow confining housing 1. A flow conduction housing 30 is provided on the top of the flow confining housing 31, which comprises a plurality of flow conduction channels similar to the flow confining housing to additionally conduct the water flow above the flow confining housing into the flow confining housing. Thus, the thrust applied on the foldable sails 24 could be increased.

In another preferred embodiment of the present invention, the waterpower conversion unit of the present invention may further comprise a balance device having a water supplying and discharging means. The balance device is mounted on the flow confining housing, which could increase or decrease the weight of the flow confining housing by supplying water to or discharging water from the balance device, thus the relative position of the waterpower conversion unit in the water could be controlled. In the embodiments shown in FIGS. 3 and 5, the balance device 33 is formed within the main frame 2 directly, to simplify the structure of present invention.

From the above description, the tidal flow power generator of the present invention is of simple structure, but could effectively convert the waterpower to electrical energy.

The present invention has been described in detail with reference to the preferred embodiments, whereas, the invention is not limited to that. It should be understood by those skilled in the art that various additional modifications and changes can be made without departing from the spirit and scope of the present invention.

What is claimed is:

1. A tidal flow power generator comprising a waterpower conversion unit, a transmission mechanism and a generator set, wherein the waterpower conversion unit includes: a cuboid shaped flow confining housing arranged longitudinally along the direction of water flow which has flow confining plates forming the sides of the flow confining housing and reinforcing supports provided between the flow confining plates, in which the both ends of the flow confining housing in longitudinal direction are open to allow water flow to pass through; a main frame mounted in the flow confining housing which has two chain sprockets spaced apart from each other, an endless track chain engaged with the two chain sprockets, and a plurality of foldable sails hinged to the track chain at one end and stretchable in a single direction, in which a inclined cable is connected between each foldable sail and the track chain, and the length of the inclined cable is determined to ensure that the foldable sails are substantially perpendicular to the track chain when the foldable sails reach the maximum stretchable extent, the part of the track chain on which the foldable sails attached are unfolded and pushed by water is a working section while the other part of the track chain is a non-working section, and the distance between the working section and the respective flow confining plate is equal to or a little larger than the length of the foldable sails when they fully stretch out, while the distance between the non-working section and the respective flow confining plate is a minimum distance allowing the folded foldable sails to pass through with the track chain, the foldable sails are unfolded by thrust of the water and then drive the track chain to rotate which force the rotation of the chain sprockets, and output gears attached on rotating shafts of the chain sprockets are engaged with the transmission mechanism and the latter finally drive the generator set to generate electricity.

2. The tidal flow power generator according to claim 1, wherein the flow confining plate is provided with a pivotable flow concentration plate near the non-working section at the upstream side of the water flow, and the flow concentration plate is hinged to the flow confining plate and opens towards the downstream side when the water flow passes by in which the maximum degree it could be opened is more than 90°, and the size of the flow concentration plate is determined in the manner that the height of the tip of the flow concentration plate is between the working section and the non-working section when it opens to the maximum degree.

3. The tidal flow power generator according to claim 1, wherein the waterpower conversion unit further comprises a balance device provided on the flow confining housing, which has a water supplying and discharging means to control the position of the waterpower conversion unit in the water.

4. The tidal flow power generator according to claim 3, wherein the balance device is provided within the main frame.

5. The tidal flow power generator according to claim 1, wherein each foldable sail comprises a plurality of segments, and the adjacent segments are hinged to each other, and a plurality of inclined cables are connected between the foldable sails and the track chain, in which the cables are parallel to each other when they fully stretch out.

6. The tidal flow power generator according to claim 5, wherein at least one connection cable is connected between adjacent foldable sails.

7. The tidal flow power generator according to claim 5, wherein one or more vacuum chambers are formed within one or more segments at the top end of each foldable sail.

8. The tidal flow power generator according to claim 1, wherein the main frame is provided with a means for adjusting its position in the flow confining housing, to change the position of the main frame and in turn the positions of the working section and non-working section of the track chain according to the direction of water flow.

9. The tidal flow power generator according to claim 1, wherein a roller is provided at the tip of the foldable sail, to decrease the friction with the flow confining plate during operation.

10. The tidal flow power generator according to claim 1, wherein the tidal flow power generator comprises a plurality of said waterpower conversion units.

11. The tidal flow power generator according to claim 1, wherein the flow confining housing only comprises flow confining plates forming its sides in vertical direction, and the unfolded foldable sails are in vertical direction.

12. The tidal flow power generator according to claim 1, wherein the flow confining housing only comprises flow confining plates forming its sides in horizontal direction, and the unfolded foldable sails are in horizontal direction.

13. The tidal flow power generator according to claim 2, wherein the waterpower conversion unit further comprises a balance device provided on the flow confining housing, which has a water supplying and discharging means to control the position of the waterpower conversion unit in the water.

14. The tidal flow power generator according to claim 13, wherein the balance device is provided within the main frame.

* * * * *